April 21, 1964
E. A. HERMAN
3,129,736
PLYWOOD PANEL PATCHING MACHINE
Filed Nov. 27, 1961
3 Sheets-Sheet 1
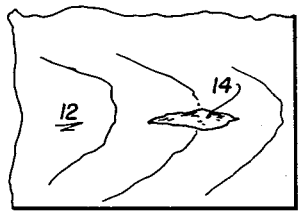
Fig. 1
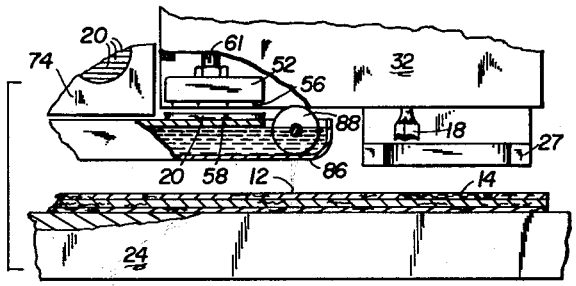
Fig. 2
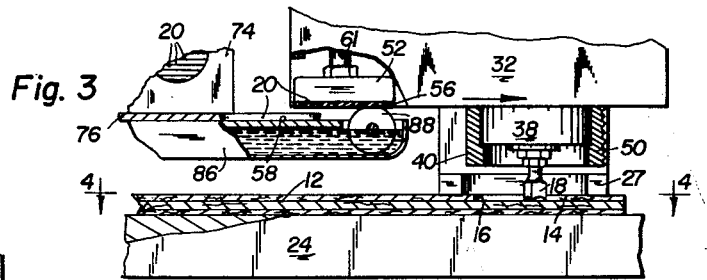
Fig. 3
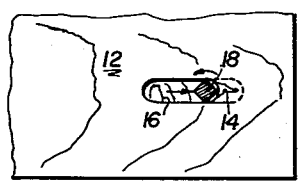
Fig. 4
Fig. 5
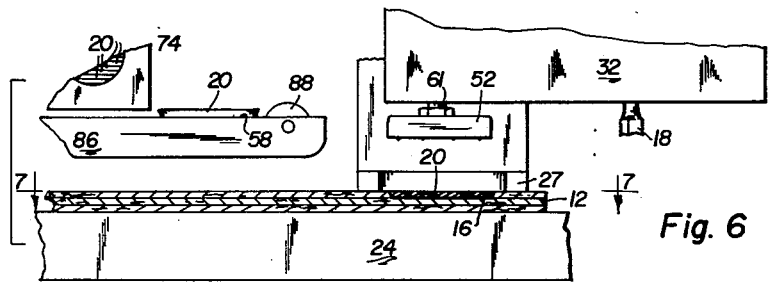
Fig. 6
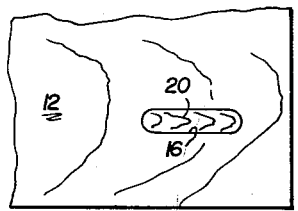
Fig. 7
INVENTOR.
EMIL A. HERMAN
BY
BUCKHORN, CHEATHAM & BLORE
ATTORNEYS April 21, 1964   E. A. HERMAN   3,129,736
PLYWOOD PANEL PATCHING MACHINE
Filed Nov. 27, 1961   3 Sheets-Sheet 2
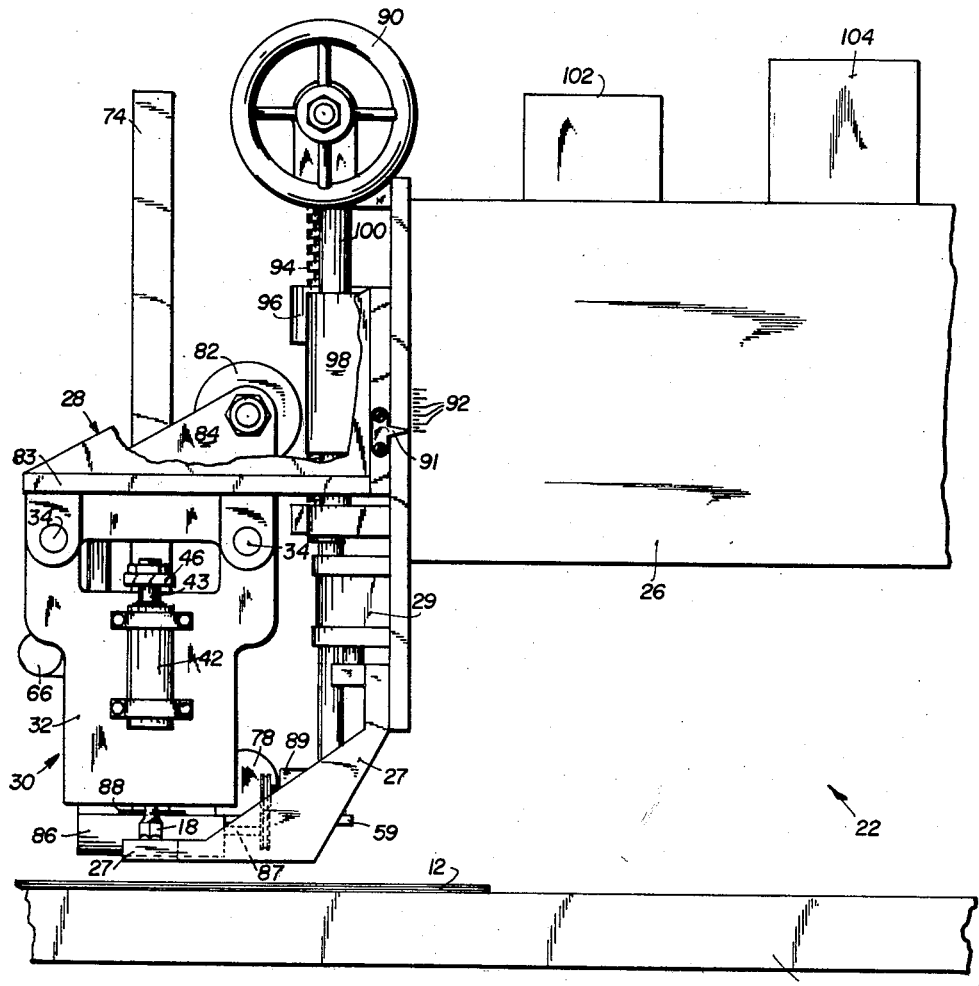
Fig. 8
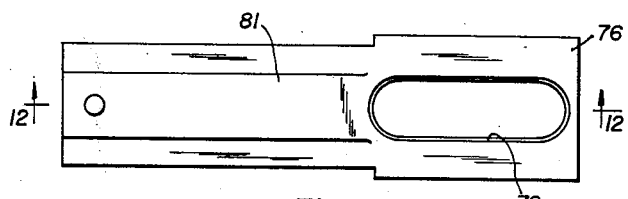
Fig. 11
Fig. 12
INVENTOR.
EMIL A. HERMAN
BY
BUCKHORN, CHEATHAM & BLORE
ATTORNEYS April 21, 1964     E. A. HERMAN     3,129,736
PLYWOOD PANEL PATCHING MACHINE Filed Nov. 27, 1961     3 Sheets-Sheet 3

INVENTOR.
EMIL A. HERMAN
BY
BUCKHORN, CHEATHAM & BLORE
ATTORNEYS 3,129,736
PLYWOOD PANEL PATCHING MACHINE
Emil A. Herman, Westfir, Oreg., assignor to Western Machinery Corporation, Portland, Oreg., a corporation of Oregon
Filed Nov. 27, 1961, Ser. No. 155,032
11 Claims. (Cl. 144—2)

This invention relates to a plywood panel patching machine and more especially to a machine for patching the surface plies of a panel with a patch of predetermined size having a thickness of about one ply.

In the manufacture of the better grades of plywood it is necessary to remove defects that frequently show up in the surface plies after the panel is formed. Commonly to remove the defect a recess is routed out to a depth of one ply where the defect appears and then a patch corresponding approximately in size to that of the recess is inserted with a hammer. Patching by hand is extremely slow for efficient production in view of the great number of defects usually appearing in surface plies.

It is therefore an object of the present invention to provide a new and useful machine for patching the surfaces of plywood panels at a much faster rate than is possible using conventional hand patching methods.

Another more specific object of the present invention is to provide a new and useful machine that will rout out a recess of a predetermined size and shape in the surface ply of a plywood panel and apply a patch of corresponding size and shape to such recess.

Still another object of the present invention is to provide in such a machine a novel vacuum means for transferring a patch from a patch storage station of the machine to the recess.

Another object of the present invention is to provide such a machine with novel means for storing a supply of patches and transferring a patch from the supply to the vacuum means.

Still another object of the present invention is to provide a novel arrangement of machine elements whereby the horizontal movement of the carriage for the router and vacuum means provides the horizontal recess-cutting stroke for the router and simultaneously provides the horizontal movement for transferring a patch to the recess.

Still another object of the present invention is to provide such a machine with a novel means for applying adhesive to a patch as it is being transferred to the recess.

Another object of the present invention is to provide a novel means in cooperation with the vacuum means for inserting a patch into the recess.

The foregoing and other objects and advantages of the present invention would be more readily ascertained from inspection of the following specification taken in connection with the accompanying drawings wherein like numerals refer to like parts throughout.

In the drawings:

FIG. 1 is a top plan view of a portion of a plywood panel having a defect in its surface ply.

FIG. 2 is a schematic view showing a portion of the machine and a panel in partial section through a defect.

FIG. 3 is a schematic view similar to FIG. 2, showing the formation of the recess.

FIG. 4 is a somewhat schematic view of the panel of FIG. 1 showing the defect being routed out.

FIG. 5 is a top plan view of a patch.

FIG. 6 is a schematic view similar to FIG. 3 after the patch has been inserted into the recess.

FIG. 7 is a top plan view of the panel of FIG. 1 after the patch has been inserted into the recess.

FIG. 8 is a partial side view of the machine showing the panel support and a portion of the frame supporting the carriages.

FIG. 11 (sheet 2) is a top plan view of the sliding member.

FIG. 12 is a sectional view along the line 12—12 of FIG. 11.

Figures 9, 10:
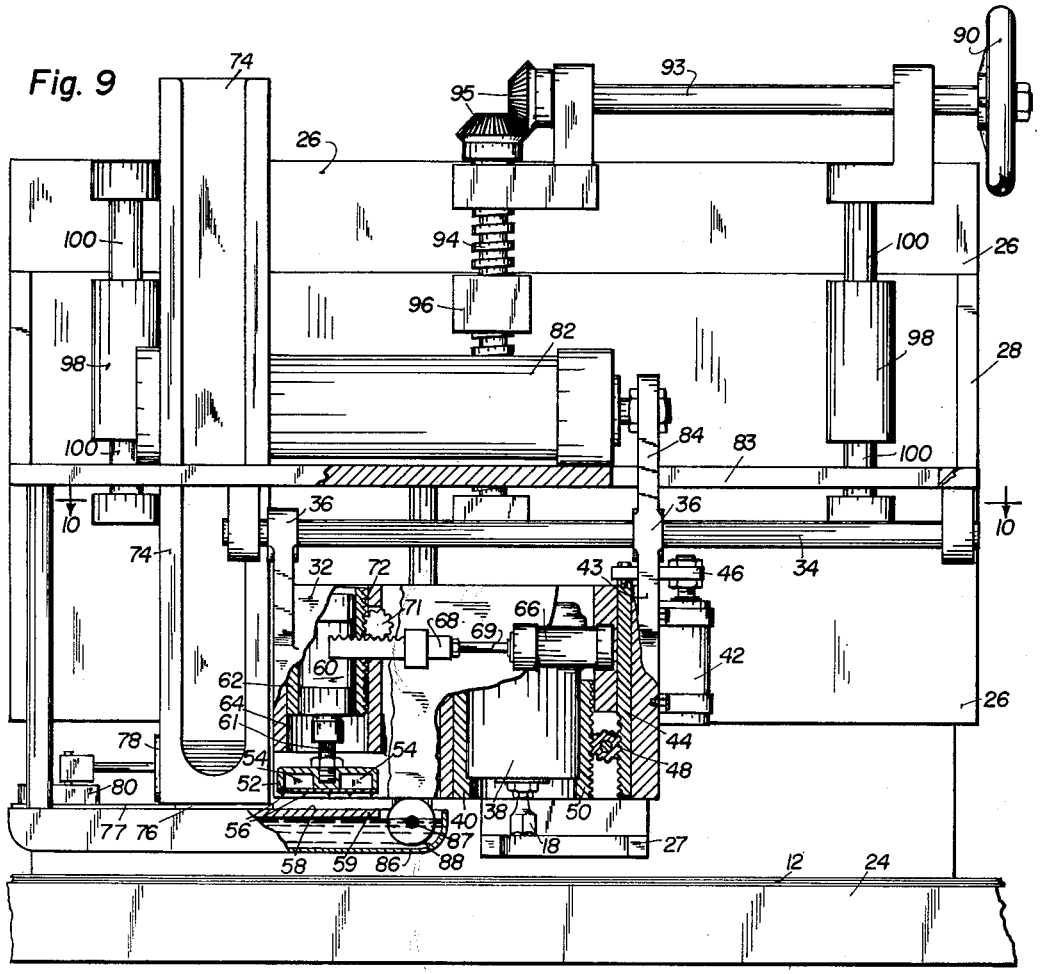
FIG. 9 is a partial end view of the machine, including a side view of the vertically adjustable carriage and housing, the latter being in partial section.
FIG. 10 is a top plan view of the housing of the present machine and the lower portion of the vertically adjustable carriage, taken along the line 10—10 of FIG. 9.

FIGS. 1 and 2 show a portion of a plywood panel 12 having a defect such as a pitch pocket 14. According to the operation of the machine of the present invention, a recess 16, FIGS. 3 and 4, is routed out of the top ply, as shown by a rotating cutter element 18 of a router having a width substantially equal to the width of the patch 20 to be inserted. The recess is formed by drawing the cutter element 18 horizontally in a straight line through the panel at a depth of about one ply thickness for a distance approximately equal to the length of the patch to be inserted. Following this, as shown in FIGS. 6 and 7 the patch 20 of a predetermined size and shape closely approximating that of the recess is inserted therein. As shown in FIG. 5, the patch has rounded ends conforming to the circle defined by the rotating cutter element, straight sides, a thickness of about one ply, and a width many times greater than its thickness.

It is to be understood that the patch, while being approximately of a size and shape corresponding to that of the recess, is of slightly greater thickness than the depth of the recess so that the surface of the patch in place will be slightly higher than the panel surface prior to final sanding thereof. Also, in accordance with the present practice in the industry the sides and ends of the patch are beveled slightly inwardly toward its bottom surface whereas the side and end walls of the recess are prependicular to facilitate entry of the patch into the recess and to insure a proper fit.

With reference to FIG. 8 the above operation is carried out in the present invention by providing a machine frame 22 including a panel support 24, upon which the panel 12 to be patched is placed, and an arm 26 of the frame extending over the support. A clamping means for holding the panel against the support while the recess is routed is provided at the end of the arm 26 and includes the foot 27 actuated by the cylinder 29, adapted to lie adjacent the recess 16.

Means are provided for removing waste from the recess prior to insertion of the patch. A suction or partial vacuum is developed in the clamping foot 27 adjacent the recess for drawing waste from the recess into an inner chamber of the foot.

The outer end of the arm supports a vertically adjustable first carriage 28 and a second, horizontally movable carriage 30, which includes primarily the rectangular housing 32.

Referring now to FIG. 9, the housing is suspended beneath a portion of the carriage 28 by means of the four sleeves 36, which are adapted to slide on the horizontally disposed guideways 34.

Still referring to FIG. 9, a recess forming means is mounted within the housing for limited vertical movement. The means provided includes the router 38 mounted within the sleeve 40, which sleeve is adapted to slide within a circular internal wall 41 of the housing. The router includes the previously mentioned cutter element 18, which is normally in a raised position as shown in FIGS. 6 and 8, but which is lowered into the panel 12 a distance of about one ply thickness in forming the recess. The cutter element is lowered by moving the entire router and sleeve downward the necessary distance.

The means provided on the housing for moving the cutter element vertically into the panel includes the rack and pinion arrangement shown. A vertical actuating cylinder 42 mounted to an outside endwall of the housing is connected by means of the rigid horizontal member 46 to a vertical rack bar 44, which extends downward through an opening in the top of the housing. The rack provided at the lower end of the bar 44 is meshed with a pinion on a horizontal pinion shaft 48 extending through the housing and journaled in opposite sidewalls thereof, which in turn is meshed with a vertical rack 50 cut into an external face of the sleeve 40. Thus an upward movement of the rod 43 of the cylinder 42 moves the cuter element downward.

With reference to FIGS. 9 and 10, the machine also includes a storage means for storing a large supply of patches and a feeder means for feeding a single patch at a time from the storage means horizontally to a pickup station 58, adjacent thereto on the lower deck 59 of the carriage 28. The patch-storage means includes the removable vertical magazine 74 mounted to the carriage 28. The feeder means includes a sliding member or plate 76 adapted to slide over the upper surface of the deck 59, within the guideways 77 and beneath the magazine. As shown in FIGS. 11 and 12, an opening 79 through the plate 76 is just large enough to receive one patch from the magazine. In order to prevent the stack of patches remaining within the magazine from dislodging the lowermost patch 20 from its position within the sliding member as it is slid from beneath the stack, a raised ridge 81 is provided longitudinally of the sliding member rearwardly of the opening 79, which raises the stack out of contact with the patch being removed. An actuating cylinder 78, FIG. 10, mounted on the lower deck 59 and linked to the sliding member 76 by means of the pivoted and slotted lever 80 provides the means for sliding such member along the deck.

A vacuum means carried by the housing is provided for lifting and holding a patch while the horizontal movement of the housing transfers the patch to the recess. The vacuum means includes the vacuum head 52 shown in FIG. 9, provided with internal vacuum chambers 54 connected to a vacuum pump (not shown) and to the bottom surface of the head. Needle-like projections 56 from the bottom surface of the head prevent rotation of a patch depending therefrom. Preferably a flexible perforated material is provided at the bottom surface to develop the partial vacuum thereat.

The vacuum head is mounted for vertical movement whereby it can be lowered from its initial level as shown, through the bottom of the housing, to a position nearly abutting the patch pickup station 58. The head 52 is connected directly to an actuating cylinder 60, which is mounted in a sleeve 62 adapted to slide within an internal circular wall 64 of the housing. The cylinder 60 with its rod 61 in a retracted position as shown merely serves as a rigid support for the head 52. More will be said about its additional function below. The means provided for effecting the vertical movement of the head is similar to that provided for the router and includes an actuating cylinder 66 mounted to an outside wall of the housing, a rack bar 68 rigidly connected to the rod 69 of the cylinder, and a pinion shaft 70 journaled in both sidewalls of the housing and extending completely through one sidewall as shown in FIG. 10. A pinion 71 provided at the shaft end extended through the housing meshes with the rack on the bar 68, and a pinion 73 intermediate the shaft ends meshes with the rack 72 provided on the sleeve 62. Movement of the cylinder rod 69 toward the cylinder moves the head downward toward the pickup station.

The means for effecting the horizontal movement of the housing includes the fluid pressure-actuated cylinder 82, mounted to the main deck 83 of the carriage 28 and connected by the rigid member 84 to the housing. The stroke of the cylinder must be sufficient to move the housing from a first limit position shown in FIGS. 2 and 9 wherein the vacuum head 52 is in vertical alignment above the pickup station 58, to a second limit position shown in FIG. 6 wherein the vacuum head is in vertical alignment with the recess. The distance covered by the housing during its movement will be at least about as great and usually greater than the length of the recess being cut since the recess is cut by the router as the patch is being transferred to that recess by the vacuum head.

Means are also provided for inserting the patch carried by the vacuum head into the recess formed by the router when the housing is in its second limit position as shown in FIG. 6. This means includes the air cylinder 60 previously mentioned, which is adapted to drive the vacuum head 52 downward against the panel whereby the patch will be forced into the recess.

Means are provided for applying adhesive to the bottom of the patch carried by the vacuum head during the horizontal movement of the housing. For this purpose a removable adhesive reservoir 86 is suspended beneath the lower deck 59 and an applicator roll 88 is mounted partially within the reservoir on the shaft 87 and so located between limit positions of the housing that the vacuum head will pass over the roll during its horizontal movement. Preferably the reservoir is provided with cooling means such as a water jacket surrounding the adhesive to prevent it from setting up on warm days. For the same purpose the applicator roll 88 is rotated continuously in a clockwise direction by a motor 89 mounted to the lower deck 59 and connected to the roller shaft 87 by a belt and pulley arrangement.

With reference now to FIGS. 8 and 9, in order to accommodate varying thicknesses of plywood, the carriage 28 can be adjusted vertically by the operator turning the wheel 90 until the pointer 91 on the carriage indicates the proper thickness according to the markings 92 on the arm 26. For this purpose, the wheel 90 and horizontal shaft 93 journaled on the arm 26 turns a threaded vertical shaft 94, also journaled on the arm, by means of mating miter gears 95, one being on each shaft. The vertical shaft 94 is threaded intermediate its ends in the nut 96 on the carriage 28, causing the carriage to move accordingly when the shaft is rotated. Two vertical cylindrical sleeves 98, one mounted rigidly near each end of the carriage 28 form vertical guideways for the two rods 100 fixed to the arm 26 during the vertical movement of the carriage.

It is to be understood that although the router will be adjustable so that the depth of cut will approximate the thickness of the surface ply of a panel, the thickness of a surface ply will vary slightly in different panels of the same thickness having the same type of surface veneer. Therefore, the approximate or average thickness of a surface ply in a given mill run is the basis for determining the depth of recess to be used in such run in order to eliminate the necessity for adjusting the router for each panel patched.

The movement of the various machine elements by means of their associated cylinders in the proper time sequence is achieved by means of the control units 102 and 104 shown in FIG. 8 mounted on top of the arm 26. These units house what is commonly called an electrical program control system which eliminates the necessity of using limit switches. Although forming no part of the present invention, briefly described the program control includes a series of electrical relays corresponding in number to the number of machine functions. The number 1 relay triggers the master cylinder valve to actuate the cylinder which performs the first function. Upon completion of the first function a second relay triggers the cylinder for performing the second function, and so on until all functions are performed. This system insures the complete performance of one machine operation before the next following operations is commenced.

Now with the machine elements thus described the sequence of operations is as follows, referring especially to FIGS. 1 to 7.

With the housing 32 in its first limit position shown in FIG. 2, the operator positions a panel 12 on the support 24 so that the defect 14 therein is aligned adjacent the router. Then, the operator presses a button to begin the machine cycle. First, the panel is clamped to the support by means of the foot 27. Then, the feeder member 76 feeds a patch 20 from the magazine to the pickup station 58, the vacuum head 52 is lowered to pick up the patch at the station, and the router cutter element is lowered into the panel. Next, the vacuum head with the patch retracts to its original position as shown in FIG. 3 and the housing begins its horizontal movement in the direction indicated by the arrow, carrying the patch over the glue roll 88 while the router simultaneously cuts the recess. When the housing has moved a distance sufficient to allow the cutter element to cut a recess of a length about equal to that of the patch, the housing stops momentarily while the cutter element is withdrawn and then it continues to its second limit position as shown in FIG. 6. Finally the cylinder 60 which carries the vacuum head is operated to insert the patch, the vacuum is released, and the head is withdrawn. Thereafter the housing returns to its first limit position.

Having illustrated and described a preferred embodiment of the invention, it should be apparent to those skilled in the art that the invention permits of modification in arrangement and detail. It is intended to claim as part of the invention all such modifications as come within the true spirit and scope of the appended claims.

I claim:

1. A machine for patching a surface ply of a plywood panel with an elongate patch of predetermined size, having a thickness of one-ply and having rounded ends and straight sides, the width of said patch being substantially greater than the said thickness, said machine comprising:
   (a) a frame, including a panel support;
   (b) means on said frame for selectively clamping a panel to said support;
   (c) a horizontally movable carriage on said frame;
   (d) a cutter element depending from said carriage, having a width substantially equal to that of said patch;
   (e) means on said carriage for moving said cutter element vertically into said panel a predetermined distance of one-ply thickness;
   (f) storage means on said frame above said panel support for storing a supply of said patches;
   (g) means on said frame for feeding a patch from said storage means horizontally to a pickup station adjacent said carriage;
   (h) vertically movable vacuum means on said carriage for picking up said patch from said pickup station;
   (i) means for moving said carriage horizontally from a first limit position wherein said vacuum means is in vertical alignment with said pickup station, an initial distance substantially equal to the length of said patch while said cutter element is in said panel to a predetermined intermediate position, means for elevating said cutter element above said panel at said intermediate position and thereafter moving said carriage a further distance to a second limit position wherein said vacuum means is in vertical alignment with the recess formed by said router;
   (j) and means on said carriage in cooperation with said vacuum means for inserting said patch into said recess when said carriage is in said second limit position.

2. A machine for patching the surface plies of a plywood panel with an elongate patch of predetermined size, of one-ply thickness, having rounded ends and straight sides, the width of said patch being substantially greater than said thickness, said machine comprising:
   (a) a frame, including a panel support;
   (b) a first, vertically adjustable carriage on said frame above said support;
   (c) a second, horizontally movable carriage on said first carriage;
   (d) a router on said second carriage for forming a recess in a panel on said support, including a cutter element of a width equal to that of said patch;
   (e) said cutter element being vertically movable into said panel a predetermined distance of one-ply thickness;
   (f) means on said first carriage for storing a supply of said patches and feeding a patch from said supply to a pickup station on said first carriage adjacent said supply;
   (g) vertically movable vacuum means on said second carriage for picking up one of said patches from said pickup station;
   (h) means on said first carriage for effecting horizontal movement of said second carriage an initial distance substantially equal to the length of said patch while said cutter element is in said panel, and a total distance sufficient to move said vacuum means from a first limit position in vertical alignment with said pickup station to a second limit position in vertical alignment with said recess;
   (i) means on said first carriage for applying glue to said patch during said horizontal movement;
   (j) and means on said second carriage for lowering said vacuum means for inserting said patch into said recess.

3. A machine for patching the surface plies of a plywood panel with an elongate patch of predetermined size, of one-ply thickness, having rounded ends and straight sides, the width of said patch being substantially greater than said thickness, said machine comprising:
   (a) a frame, including a panel support;
   (b) a vertically adjustable first carriage on said frame above said support;
   (c) a second carriage mounted on said first carriage for horizontal movement;
   (d) a router on said second carriage, including a cutter element the width of said patch adapted to penetrate a panel on said support a predetermined distance of one-ply thickness;
   (e) a magazine on said first carriage for storing a supply of said patches;
   (f) a feeder means on said first carriage, including a member adapted to slide beneath said magazine and feed a patch horizontally from the bottom thereof to a pickup station on said first carriage adjacent said magazine;
   (g) vertically movable vacuum means on said second carriage for picking up said patch from said station;
   (h) said vacuum means being horizontally movable from a first limit position in vertical alignment with said pickup station to a second limit position in vertical alignment with a recess formed by said cutter element by said horizontal movement of said second carriage;
   (i) and means for moving said vacuum means vertically for picking up a patch from said station and for inserting a patch into a recess.

4. A machine for patching the surface plies of a plywood panel with an elongate patch of predetermined size, of one-ply thickness, having rounded ends and straight sides, the width of said patch being substantially greater than said thickness, said machine comprising:
   (a) a frame, including a panel support and clamping means;
   (b) a vertically adjustable carriage on said frame above said support;
   (c) a generally rectangular housing depending from horizontal guideways on said carriage;
   (d) a router mounted in said housing for forming a recess corresponding substantially in size to that of said patch;

(e) means on said frame for removing waste from said recess prior to insertion of said patch;

(f) vacuum means carried by said housing for picking up one of said patches from a pickup station on said carriage;

(g) means on said housing for effecting the vertical reciprocation of said router and vacuum means;

(h) a patch storage magazine on said carriage adjacent said pickup station;

(i) feeder means on said carriage for transferring a patch from said magazine to said pickup station;

(j) cylinder means on said carriage for effecting the horizontal movement of said housing along said guideways;

(k) said horizontal movement transferring said vacuum means from a first limit position in vertical alignment with said pickup station to a second limit position in vertical alignment with said recess and simultaneously providing the cutting stroke for said router;

(l) an adhesive applicator roll adapted to rotate interposed between said limit positions for applying adhesive to a patch on said vacuum means during said horizontal movement.

(m) and cylinder means connected to said vacuum means for insertion of said patch into said recess when said vacuum means is in said second limit position.

5. A machine according to claim 4 wherein said feeder means, said magazine, said pickup station, said vacuum means and said router are maintained in horizontal alignment at all times.

6. A machine according to claim 4 wherein said clamping means includes a foot adapted to claimp said panel adjacent said recess and said means for removing waste from said recess includes suction means within said foot.

7. A machine for patching a surface ply of a plywood panel with an elongate patch of predetermined size having a thickness of one ply, rounded ends and straight sides, the width of said patch being substantially greater than said thickness, said machine comprising, in combination:

(a) a stationary frame, including a panel support table, (b) a carriage mounted for horizontal movement on said frame above said table, (c) a router cutter element mounted on said carriage for vertical movement and directed downwardly toward said table, (d) means on said carriage for moving said cutter element from an upper, noncutting position into a lower, cutting position in engagement with a panel to be patched, (e) patch pickup means mounted for vertical movement on said carriage laterally adjacent said cutter element for picking up and supporting a patch in dependent relationship from the bottom of said means, (f) patch storage means on said frame laterally adjacent said carriage and said pickup means thereon for storing a supply of precut patches, (g) a patch pickup station on said frame adjacent said storage means and beneath said carriage, (h) patch feeder means on said frame beneath said storage means for feeding a patch horizontally from the lower end of said storage means to said pickup station, (i) drive means on said frame, operable when said router cutter element is in said lower, cutting position, for moving said carriage horizontally from a first limit position wherein said pickup means is in vertical alignment above said pickup station to an intermediate position a sufficient distance from said first limit position such that said router cutter element forms an elongate recess of a length substantially equal to that of said patch, said drive means being operable further after said router cutter element is raised to said upper, noncutting position, for moving said carriage from said intermediate position to a second limit position wherein said pickup means is in vertical alignment above said recess, (j) glue applicator means on said frame, and positioned beneath said carriage and between said router cutter element and said pickup means when said carriage is in said first limit position such that glue is applied to the underside of a patch depending from said pickup means during the horizontal movement of said carriage, (k) and insert means on said carriage operably connected to said pickup means and operable upon the arrival of said carriage to said second limit position for driving said pickup means downwardly and said patch into said recess.

8. A machine according to claim 7 wherein said patch pickup means includes a head portion having a planar bottom surface of rubber like material corresponding generally in size and shape to the size and shape of said patch, a plurality of needle like projections projecting outwardly from said bottom surface, and a vacuum chamber within said head and communicating with said bottom surface.

9. A machine according to claim 7, including:

(a) a flat deck portion mounted on said overhead frame portion and spaced horizontally beneath said patch storage means and a portion of said carriage when the latter is in said first limit position, (b) said deck portion including said patch pickup station, (c) said patch feeder means including a slide member on said deck portion and having an opening therethrough of a size and shape to receive a single patch, a raised ridge extending longitudinally of said member rearwardly of said opening, and power cylinder means operatively connected to said slide member for sliding the same from a first position wherein said opening is in vertical alignment beneath said patch storage means to a second limit position wherein said opening is at said pickup station.

10. A machine according to claim 7 wherein:

(a) said patch insert means includes a first power cylinder mounted for vertical movement on said carriage above said pickup means and a piston rod of said cylinder operatively connected to said pickup means, (b) and said means for moving said bottom surface of said pickup means vertically downwardly into engagement with a patch at said pickup station includes a second power cylinder on said carriage and gear means operatively connecting said second power cylinder to said first power cylinder.

11. A machine according to claim 7 wherein said clamping means includes a foot portion adjacent said router cutter element shaped to at least partially encircle a defective area in a panel surface, power means on said frame for selectively lowering said foot into engagement with a panel adjacent a recess cut by said router, said foot including suction means in communication with surface portions thereof adjacent said recess for removing waste material from said recess.

References Cited in the file of this patent

UNITED STATES PATENTS

| | | |
|---|---|---|
| 1,838,426 | Maurer | Dec. 29, 1931 |
| 2,336,704 | Skoog | Dec. 14, 1943 |
| 2,630,151 | Turnbull | Mar. 3, 1953 |
| 2,643,689 | Sherman | June 30, 1953 |
| 2,643,690 | White | June 30, 1953 |
| 2,675,038 | Carlson | Apr. 13, 1954 |
| 3,022,806 | Johnston | Feb. 27, 1962 |